US012064036B2

(12) United States Patent
Sternving

(10) Patent No.: US 12,064,036 B2
(45) Date of Patent: Aug. 20, 2024

(54) POCKET MATTRESS COMPRISING INTEGRATED FOAM MATERIAL

(71) Applicant: Starsprings AB, Herrljunga (SE)

(72) Inventor: Björn Sternving, Fristad (SE)

(73) Assignee: Starsprings AB, Herrljunga (SE)

( * ) Notice: Subject to any disclaimer, the term of this patent is extended or adjusted under 35 U.S.C. 154(b) by 90 days.

(21) Appl. No.: 17/334,865

(22) Filed: May 31, 2021

(65) Prior Publication Data

US 2022/0378216 A1 Dec. 1, 2022

(51) Int. Cl.

*A47C 27/05* (2006.01)
*A47C 27/06* (2006.01)
*A47C 27/14* (2006.01)
*A47C 27/15* (2006.01)
*B68G 7/00* (2006.01)

(52) U.S. Cl.

CPC .......... *A47C 27/056* (2013.01); *A47C 27/064* (2013.01); *A47C 27/148* (2013.01); *A47C 27/15* (2013.01); *B68G 7/00* (2013.01)

(58) Field of Classification Search

CPC ... A47C 27/064; A47C 27/056; A47C 27/148; A47C 27/15; A47C 27/06; A47C 27/065; A47C 27/063; A47C 27/062; B68G 9/00; B86G 7/00

See application file for complete search history.

(56) References Cited

U.S. PATENT DOCUMENTS 1,287,662 A * 12/1918 Foster .................. A47C 27/064 5/655.8
6,591,438 B1 7/2003 Edling
7,748,065 B2 7/2010 Edling
8,087,114 B2 1/2012 Lundevall
9,936,815 B2 4/2018 DeMoss
2007/0124865 A1* 6/2007 Stjerna ................. A47C 27/064 5/655.8
2011/0107523 A1* 5/2011 Moret .................. A47C 23/043 5/718

(Continued)

FOREIGN PATENT DOCUMENTS

KR 101054454 B1 * 8/2011 ............. A47C 27/07
KR 101054454 B1 8/2011
WO WO2019/096793 5/2019

OTHER PUBLICATIONS

European Search Report for EP21176794.2 that claims priority to the instant application; dated Nov. 16, 2021; 9 pages.

*Primary Examiner* — Justin C Mikowski
*Assistant Examiner* — Alison N Labarge
(74) *Attorney, Agent, or Firm* — Harness, Dickey & Pierce, P.L.C.; Anthony G. Fussner

(57) ABSTRACT

A spring mattress comprises a plurality of interconnected coil springs enclosed in casings, the springs having a first and a second end, wherein for at least one of the springs, casing portions arranged at the first and second ends of the spring are connected to each other through the spring by a joint. The joined casing portions comprise openings through the spring. Pieces of foam material are arranged in the openings, so that a first portion of each piece of foam material extends towards the first end of the spring and a second portion of each piece of foam material extends towards the second end of the spring. An apparatus and method for manufacturing such a mattress are also disclosed.

24 Claims, 10 Drawing Sheets

(56) References Cited

U.S. PATENT DOCUMENTS

| | | | | |
|---|---|---|---|---|
| 2011/0197367 | A1* | 8/2011 | Mossbeck | A47C 27/064 5/655.8 |
| 2013/0269115 | A1* | 10/2013 | Bader | A47C 27/20 5/718 |
| 2015/0342362 | A1* | 12/2015 | DeMoss | A47C 27/20 5/718 |
| 2016/0367042 | A1* | 12/2016 | Fisher | A47C 31/105 |
| 2019/0142179 | A1* | 5/2019 | Hegg | A47C 27/064 5/720 |
| 2022/0015549 | A1* | 1/2022 | Vetter | A61G 7/05715 |

* cited by examiner

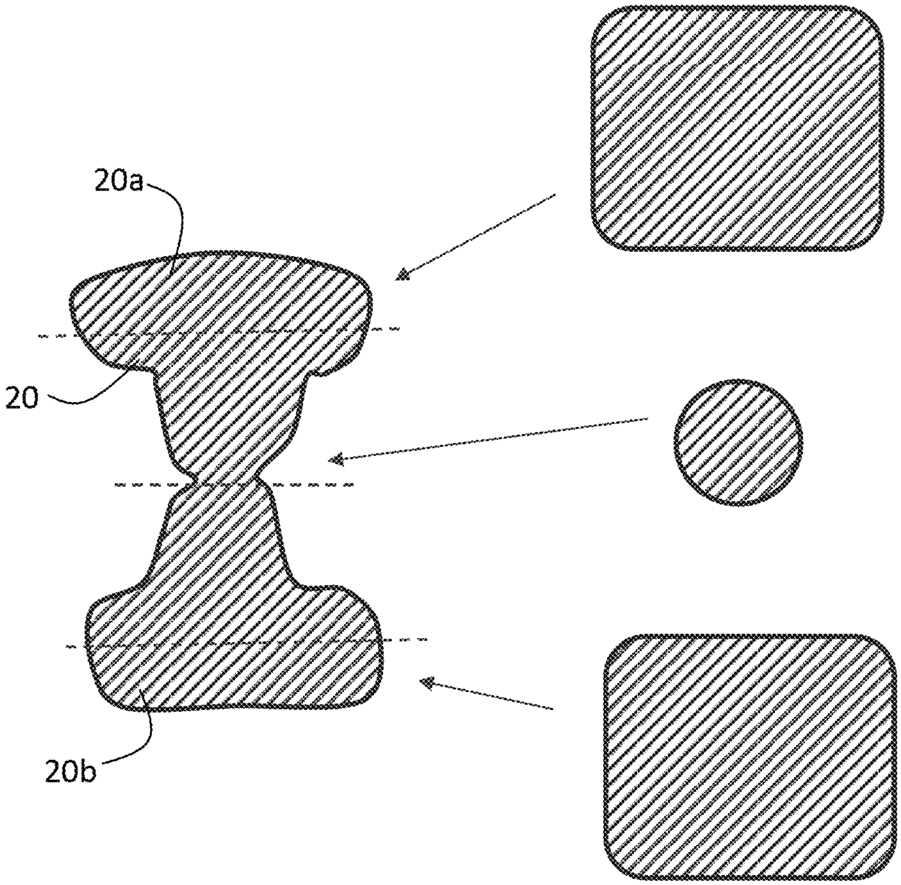
Fig. 7
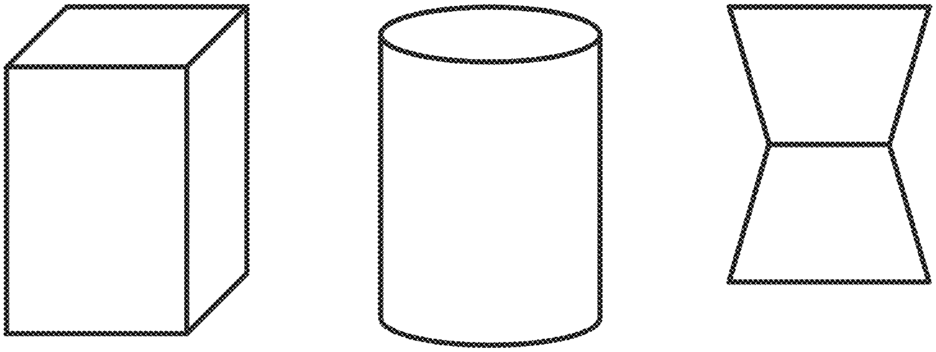
Fig. 14a
Fig. 14b
Fig. 14c

POCKET MATTRESS COMPRISING INTEGRATED FOAM MATERIAL

TECHNICAL FIELD OF THE INVENTION

The present invention relates to a spring mattress comprising springs enclosed in casings, a so-called pocket mattress, wherein casing materials at the ends have been connected together through the springs, thereby forming doughnut shaped enclosures/pockets. The invention is also related to a method and device for producing such mattresses.

BACKGROUND OF THE INVENTION

A common technique of making spring mattresses is the so-called pocket technique. This means that the springs are enclosed in pockets, i.e. they are individually enclosed by a casing material. In this way, the springs will be relatively individually resilient so that they can flex individually without affecting the neighboring springs and, thus, the comfort to the user increases since the weight will be distributed more uniformly over the surface that receives the load.

A drawback of this type of mattress is, however, that it is difficult to provide thin mattresses. If the length of the springs is reduced without a corresponding reduction of the width, the spring will, especially when the length approaches the length of the diameter of the spring, have a tendency to turn in the casing, which dramatically deteriorates the comfort of the mattress. When such mattresses are to be manufactured, the existing technique requires the use of a much larger number of springs. Consequently the manufacturing will be considerably more expensive and more complicated. Besides it is difficult to prevent such mattresses from also being stiffer since too thin spring wires cannot be used.

For these reasons, it has not been possible to use spring mattresses for many purposes where thinner mattresses are required, such as for overlay mattresses, seat cushions and the like. In spite of this, spring mattresses have several properties making it desirable to use them also in these contexts, such as excellent comfort, individual flexibility, a long life and easy and inexpensive manufacture.

A solution to this problem has been presented by the same applicant in U.S. Pat. Nos. 6,591,438, 7,748,065 and 8,087,114. Here, the end portions of the casings are moved towards each other and connected to each other through the springs, which gives a bias of the springs, and a very compact and useful mattress. This enables production of very thin pocket spring mattresses. A similar type of mattress is disclosed in WO 2019/096793, also by the same applicant. Such mattresses are very useful as additional mattresses, arranged on top of another mattress, such as comfort layers, toppers or the like.

However, lying directly on the pocket mattress is normally not comfortable, and in order to provide good sleeping and resting comfort, it is normally required to add an additional layer of padding or the like on top of the mattress. Such a padding layer is often assembled together with the pocket mattress, to form an encased upholstered mattress. Alternatively, a separate padding mattress may be laid loosely on top of the pocket spring mattress. A drawback of such an additional top layer is, however, that this reduces the individual resilience of the pocket units, and provides a less than optimal pressure distribution.

There are also examples of attempts to integrate foam material in the individual pocket units of a pocket spring mattress. Such an attempt is e.g. disclosed in U.S. Pat. No. 9,936,815. However, this mattress is relatively complicated and costly to produce. Further, it is difficult to obtain sufficient attachment of the foam material to the pocket units, and there is a great risk that the foam material will be detached from the pocket units over time.

Thus, a drawback of this and similar previously proposed mattresses are that connection of the foam/padding to the coil spring and pocket is relatively complicated and costly to achieve. Further, there is a sever risk that the foam/padding will be deformed or disconnected, and e.g. be pushed into the convolutions of the coil spring. This will significantly deteriorate both the appearance and the comfort of the mattress.

There is a therefore a need for individual pocketed coil springs and a pocket spring mattress which is easier and/or less expensive to manufacture but which at the same time provides at least an equivalent comfort compared with other prior-art pocket mattresses. It is also a need for such individual pocketed coil springs and pocket spring mattresses that delivers improved resiliency and responsiveness and that enables the use of reduced amounts of cushioning or padding material on top of the bedding or seating product once the spring assembly is complete. Still further, there is a need for such individual pocketed coil springs and pocket spring mattresses that are more robust and which maintains their properties over a prolonged period of time and use. In particular, there is a need for toppers, comfort layers and the like having such properties.

Thus, there is still a need for improvements of pocket mattresses in terms of comfort and sleeping quality. There is also a general need to improve the longevity of the mattresses.

SUMMARY OF THE INVENTION

It is an object of the present invention to provide a pocket spring mattress, as well as a method and a device for manufacturing the same, that at least partly overcomes or alleviates the above-discussed problems.

This object is achieved by a spring mattress as well as a method and a device for manufacturing the same according to the claims.

This and other objects are achieved by a spring mattress comprising a plurality of interconnected coil springs enclosed in casings, the springs having a first and a second end, wherein for at least one of the springs, casing portions arranged at the first and second ends comprise openings through the spring, and pieces of foam material arranged in said openings, so that a first portion of each piece of foam material extends towards the first end of the spring and a second portion of each piece of foam material extends towards the second end of the spring.

The casing portions arranged at the first and second ends of the spring may be separated and located at, or close to, the first and second ends of the spring. However, preferably the casing portions arranged at the first and second ends of the spring are connected to each other through the spring by a joint, and wherein the openings are arranged close together, in said joined casing portions.

This mattress is of the general type as disclosed in WO 2019/096793 by the same applicant, which is hereby incorporated by reference, and thus has essentially all advantages that are associated with this type of mattress, such as the possibility of making the mattress thin, the advantageous bias of the springs etc. However, the inventive mattress also provides a number of additional advantages.

With the provision of an opening through the pockets and the springs, in the interconnection of the casing portions, it has been found that such an opening forms a very efficient and convenient way of fixating the foam material to the pocket units. The opening forms a waist in the foam material, which mechanically holds the foam material in a fixed position. It also enables very quick and cost-efficient manufacturing, since it allows pre-formed pieces of foam material to be inserted and assembled into place in an already prepared mattress. The pieces of foam material can also be introduced from only one side of the mattress, but still extend out towards both sides in the assembled mattress. This makes it possible to use a conventional manufacturing process for making pocket mattresses, and to simply add the foam material as a subsequent step. Hereby, the present invention lends itself very well to automated and cost-efficient manufacturing, and it is also relatively simple to incorporate the additional step of assembling the pieces of foam material into the pocket units produced in the previously known and used manufacturing processes.

Further, there is no need to connect the pieces of foam material directly to the coil springs. Instead, the foam material is arranged separated from the coil springs by the casing fabric.

The foam material provides an increased stability and resilience in the interior of the coil springs. In addition, the foam material extending out from the ends of the coil springs forms an upper and/or lower surface of foam material, which provides a soft and comfortable upper and/or lower surface and layer of the mattress, thereby alleviating the need for additional padding layers and the like.

The present invention provides individual pocket spring units, each comprising a piece of foam material, arranged within the coil springs, and preferably dimensioned to extend out towards the ends of the coil springs. By the provision of a piece of foam material within each individual pocket unit, each coil spring functions independently, resulting in a more comfortable bedding or seating product. Hereby, the individual resilience of the pockets is maintained, providing excellent comfort and pressure distribution. For such pocket units, there is no need for additional padding layers, since a cushioning pad is already incorporated in each pocket unit, at least within the cavity formed by each coil spring, and preferably also extending out past the ends of the coil springs.

Further, the fact that the coil spring and the piece of foam material in each pocket unit are separated from each other by the casing fabric ensures that the foam material will always remain in place. The casing material of the pocket unit encasing the coil spring hinders the foam material of getting displaced during use. Consequently, the appearance and the comfort of the mattress will be maintained even during prolonged period of use.

In addition, the foam material may be porous and air permeable, thereby allowing aeration and ventilation through the mattress through the openings, despite the presence of foam material therein. A significant volume of moisture leaves the body during sleep. Thanks to the improved aeration/ventilation, this moisture will be taken care of more efficiently, and without making the mattress damp. The moisture will more efficiently be removed from the user's body, and away from the mattress. Further, this improves the comfort and sleeping quality, and will enable a more stable sleeping temperature and humidity for the user. This will make temperature regulation for the user easier. Also, the reduction of damp and moisture in the mattress will counteract assembly and growth of dust mites, mold, bacteria etc, and will thereby maintain the mattress in a hygienic condition for a much longer time. This will also reduce the risk for development of allergies. It will also reduce the risk of unwanted odors. Overall, the improved aeration and ventilation will make it possible to maintain the mattress in a clean and hygienic state for a much longer time, thereby increasing the longevity of the mattress.

Additional second openings may also be provided, in locations between the springs. Such openings may e.g. be arranged in locations between four adjacent springs. Preferably, one such opening is provided in all, or essentially all, groups of four adjacent springs. Such additional second openings also improves the ventilation and aeration of the mattress.

The present invention is based on the realization that in this particular type of mattress, i.e. a pocket spring mattress in which the casing portions arranged at the ends of the spring has been joined to each other through the spring, and with an opening through the joint, arrangement of a piece of foam material is particularly easy and efficient, due to the opening providing access to the entire internal cavity of the pocket unit, and both ends, and also by providing mechanical fixation of the foam element.

The foam element may be kept in place solely by the mechanical fixation. However, alternatively, additional fixation may also be provided, such as by welding, adhesive, or the like.

In accordance with the present invention, each pocket, i.e. the casing enclosing each spring, is formed as a toroid, having a doughnut shape, forming a circular compartment enclosing the spring. Further, the foam material may be formed as an hourglass, having a central waist, and two expanding, mushroom shaped parts extending away from the waist in two opposite directions. Due to the elastic and flexible properties of the foam material, the two shapes, i.e. the toroid shape of the casing and the hourglass shape of the foam material will to a large extent be complementary to each other, so that the overall cross-sectional shape of the pocket unit will be in the form of a circle, or a rectangle with rounded corners, or a shape therebetween.

At least one of said first and second portions of the pieces of foam material preferably extends past the first and second end of the spring, respectively. In a preferred embodiment, the foam material bulges out on each side of each spring. Hereby, a foam provides an outermost layer of the mattress. However, it is also feasible that the foam material extends out past the spring end on only one side. It is also feasible that the foam material does not extend out past any of the ends. In such embodiments, the foam material may be flush with the plane of the end convolution of the coil spring, or be situated below such a plane.

The protruding pieces of foam material may form a rounded, convex upper and/or lower surface. However, alternatively, the protruding pieces of foam may form a generally flat surface, thereby forming a generally flat and even mattress surface. In yet another alternative, the protruding pieces of foam material may have a lowered central part, surrounded by a rim, thereby providing cup-shaped or concave upper and/or lower surfaces.

In an embodiment, each piece of foam material may be compressed in the part arranged in the opening, thereby forming a waist in the piece of foam material at said opening, and wherein the first and second portions of the piece of foam material gradually expands into larger cross-sectional shapes in a direction away from the opening.

Part(s) of the foam material extending out past the first or second end of the spring may have cross-sectional dimensions which are equal to or greater than the diameter of the upper or lower end convolution of the spring through which it extends. Hereby, the extending foam material forms a relatively continuous layer above the springs.

The foam material can be made of various materials. In a preferred embodiment, the foam is made of urethane, latex or a visco-elastic foam.

The pieces of foam material may be made of a homogeneous material, However, the pieces of foam material may also comprise a combination of different materials. Such different materials may e.g. be arranged in different layers, e.g. forming a laminated structure. The layers are preferably arranged in planes parallel with the mattress plane, i.e. arranged above or below each other in a direction parallel to the axial direction of the springs.

For example, the pieces of foam material may have a more costly material, such as latex or visco-elastic material, towards one or two sides, thereby arranged as a top and/or bottom layer, and a central layer of a less expensive material, such as polyurethane. Hereby, the top and/or bottom layers may have different properties than the central layer, such as being softer, denser, more visco-elastic, or the like. Additionally, or alternatively, the pieces of foam material may also comprise thin additional layers of materials not being foam materials, such as cloth, padding, a piece of fabric or the like. Such additional thin layers may e.g. be arranged to provide a more durable upper and/or lower surface, a smoother upper and/or lower surface, a denser upper and/or lower surface, and the like. Such additional thin layers may also be arranged between different layers of foam materials.

In an embodiment, the pieces of foam material comprises at least two layers, and preferably at least three layers, and more preferably at least four layers, and most preferably at least five layers.

The pieces of foam material may have a relaxed shape of a cuboid or a cylinder. The relaxed shape is the shape of the foam material when not constrained within the springs, i.e. an unbiased shape. The pieces of foam material may have a relaxed shape with essentially uniform cross-sectional shape and dimensions, as seen perpendicularly to the length direction.

However, alternatively, the foam material may have a relaxed shape forming a waist, and for example a shape generally corresponding to the shape assumed when placed in the spring units.

The foam material may be preformed, and compressed to be inserted into the spring units. However, alternatively, the foam material may be formed directly in the spring units, for example by being injected into the desired position in a liquid state.

The connection of the casing portions is preferably given such a size and shape that the connection obtains sufficient strength and stability. Furthermore, the shape and size of the connection can be varied to give different degrees of bias of the springs. In this way, it is possible to easily vary the bias between different mattresses, and also between different springs in one and the same mattress. Preferably, the connection forms a symmetric joint area.

The opening is preferably within a perimeter of the joint between the casing portions. The joint may e.g. be formed by welding, and may be formed by a continuous connection line, or by separated connection points or areas, e.g. arranged as a dashed or dotted line, or the like. The opening may be substantially circular. However, alternatively, the openings may be in the form of a polygon, such as a rectangle, a square, a hexagon, or the like. Other shapes, such as an oval shape, are also feasible. Preferably the opening has a symmetric shape, and most preferably the opening is substantially circular.

The joint is preferably formed by a surface joint, such as an adhesive, a weld or the like. In a preferred embodiment, the surface joint is formed by welding.

The diameter of the openings is preferably much smaller than the diameter of the springs, i.e. the diameter of the largest turn of the springs. In particular, the diameter of the openings may be about half the diameter of the largest turn of the corresponding strings. In an embodiment the average diameter of the openings is within the range 30-70% of the average diameter of the springs, and preferably within the range 40-60%, and most preferably within the range 45-55%.

The casing portions may be connected by a continuous welding around the opening or a plurality of welding points distributed around the opening.

The casing portions may be connected by a plurality of welding points distributed around the opening. For example, the joint may comprise 2, 3, 4, 6 or 8 welding points. Alternatively, the casing portions may be connected by a continuous welding around the opening. By providing welding around the opening proper strength is maintained in the interconnection in spite of the opening. The welding points may be symmetrically arranged around the opening to ensure sufficient strength in the interconnection.

In an embodiment, the casings form a plurality of strings interconnected side by side, and preferably in parallel to each other, each string comprising a continuous casing material, said casings being defined by at least one longitudinal connecting line extending parallel to the longitudinal direction of the string and a plurality of transverse connecting lines extending transversely to the longitudinal direction of the string, and coil springs arranged in the casings and pockets of the string, wherein the connecting lines are preferably arranged at the side of the springs, and thus between neighboring springs.

The longitudinal connecting lines and the transverse connecting lines of the strings preferably extend substantially at right angles to the longitudinal axes of the springs. Furthermore, the longitudinal connecting lines and the transverse connecting lines of the strings preferably extend in essentially the same plane, which plane preferably is substantially perpendicular to the longitudinal axes of the springs.

Connecting the strings to each other via the longitudinal connecting lines has been found very advantageous. By the longitudinal connecting lines, which typically consist of welds, in many cases projecting from the string, an advantageous separation of the strings is automatically obtained. Moreover, the strings are in this way attached to each other only along a line, and preferably only at a number of points along this line. This has been found to give a very flexible mattress, where the springs are extremely movable in relation to their neighbors.

In another embodiment, the casings are formed by an upper and a lower sheet of fabric, the sheets being connected to each other between the springs to form the pockets. For example, the casings may be formed by a relatively large upper sheet and a relatively large lower sheet, the sheets being connected together along longitudinal and lateral connections lines, e.g. forming a checkerboard pattern, thereby forming the individual pockets for the springs. Thus, in such an embodiment, the pockets are integrated with each other be the same material not only in one direction, as in the above-discussed string embodiments, but in two directions, i.e. both in a length and width dimension.

The connection of the sheets may e.g. be provided in the form of connection lines, e.g. arranged as a first set of parallel lines running in a first direction, and a second set of parallel lines running in a second direction, the second direction e.g. being perpendicular to the first direction. Hereby, the connection lines may e.g. form a grid, enclosing the springs between them. However, alternatively, the connection lines may e.g. be arranged as circles, or polygons, encircling each spring. In yet another alternative, the connection may be formed as point connections, or connections formed as an X, a circle or the like, arranged between the springs, and preferably in each group of four springs, i.e. in each "four-leaf clover" formed by the springs.

The casings may be made of a, preferably weldable, textile material.

In an embodiment, the connection of the casing portions at the ends of each spring is such that the springs are biased, and preferably biased so that the length of the spring in the biased state is less than ⅔ of the length of the same spring in a non-biased state, and most preferably less than ½, or wherein preferably the springs, through which the casing material portions arranged at the ends of the spring are moved towards each other, have a height which is less than the width of the springs, preferably less than ⅔ of the width, and most preferred is about ½ of the width or less.

According to another aspect of the invention, there is provided an apparatus for manufacturing of a pocket spring mattress, comprising:

a device for enclosing springs in a casing material;

a device for forming openings in casing portions arranged at the first and second ends of the springs, and optionally to connect said casing portions to each other through the spring by a joint; and a device for inserting pieces of foam material in said openings, so that a first portion of each piece of foam material extends towards the first end of the spring and a second portion of each piece of foam material extends towards the second end of the spring.

With this apparatus, a mattress of the type discussed above may be manufactured, and corresponding advantages as related with regard to this new mattress are achieved.

The device for connecting casing portions through the spring may comprise an inserter and a counteracter arranged at a distance therefrom, the inserter and the counteracter being adapted to perform a relative displacement towards and away from each other to bring casing materials at the spring ends of a spring arranged there between towards each other through the spring, such that the spring becomes biased, and an interconnector for forming a joint connecting the thus brought-together casing materials from the two spring ends, and a punch for punching an opening in the interconnection between the casing materials from the two spring ends.

In one embodiment, the inserter and counteracter may be arranged both to provide the connection, e.g. by welding, and to form the opening, e.g. by punching.

The device for inserting pieces of foam material may comprise a compressing arrangement, such as a funnel, for compressing a foam material to a size enabling insertion into the opening inside the springs. However, alternatively foam may be formed directly in the desired position, e.g. by means of an injector providing the foam material in liquid form.

According to another aspect of the invention, there is provided a method for manufacturing a spring mattress comprising a plurality of interconnected coil springs enclosed in casings, comprising the steps of enclosing the springs in a casing material, biasing at least one of the springs, and interconnecting the springs, the step of biasing the springs comprising the partial steps of moving casing portions arranged for the ends of the spring towards each other, through the spring and interconnecting them by means of a joint, forming an opening in the joint, through the spring, and arranging pieces of foam material in said openings, so that a first portion of each piece of foam material extends towards the first end of the spring and a second portion of each piece of foam material extends towards the second end of the spring.

With this method, a mattress of the type discussed above may be manufactured, and corresponding advantages as related with regard to this new mattress are achieved.

The step of forming the opening in the joint may be performed prior to forming the joint, after formation of the joint, or simultaneously with the joint formation. In case the forming of the opening is made prior to forming the joint, the forming of the opening may be made prior to insertion of a spring into the casing/pocket, or alternatively after insertion of the spring.

These and other advantages of the current invention will be evident from the following detailed description of specific embodiments.

BRIEF DESCRIPTION OF THE DRAWINGS

The present invention will be described in more detail with reference to the appended drawings, showing embodiments of the invention.

FIGS. **6*a* and 6*b*** are schematic views from the side, in cross-section, illustrating alternative steps and devices for insertion of a piece of foam element through the springs;

FIG. 7 is a schematic illustration, in various cross-sectional views, of the foam element of FIGS. **6*a* and 6*b*;**

Figure 8:
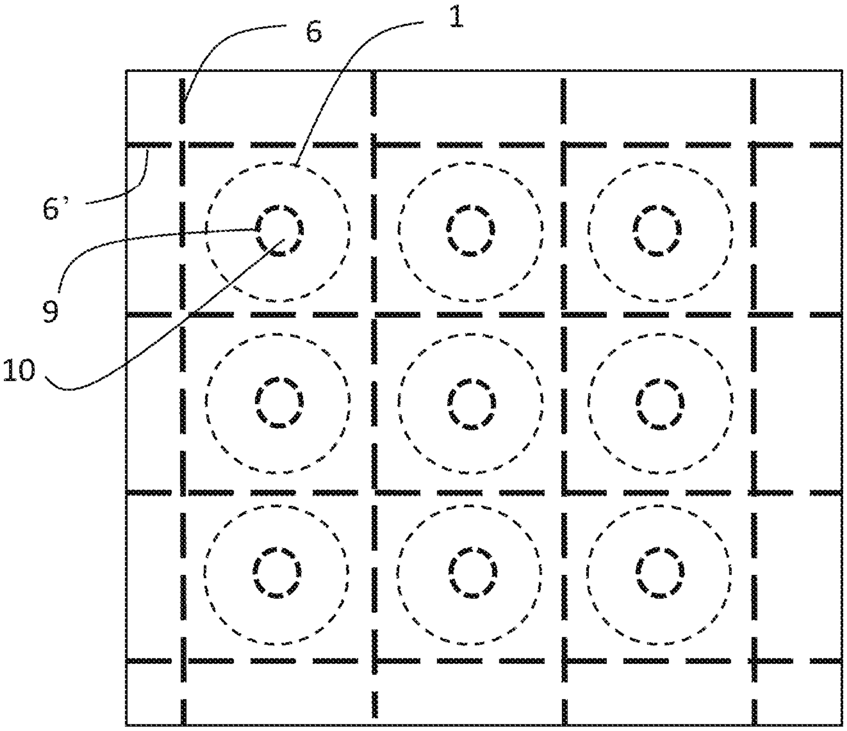
Figure 9:
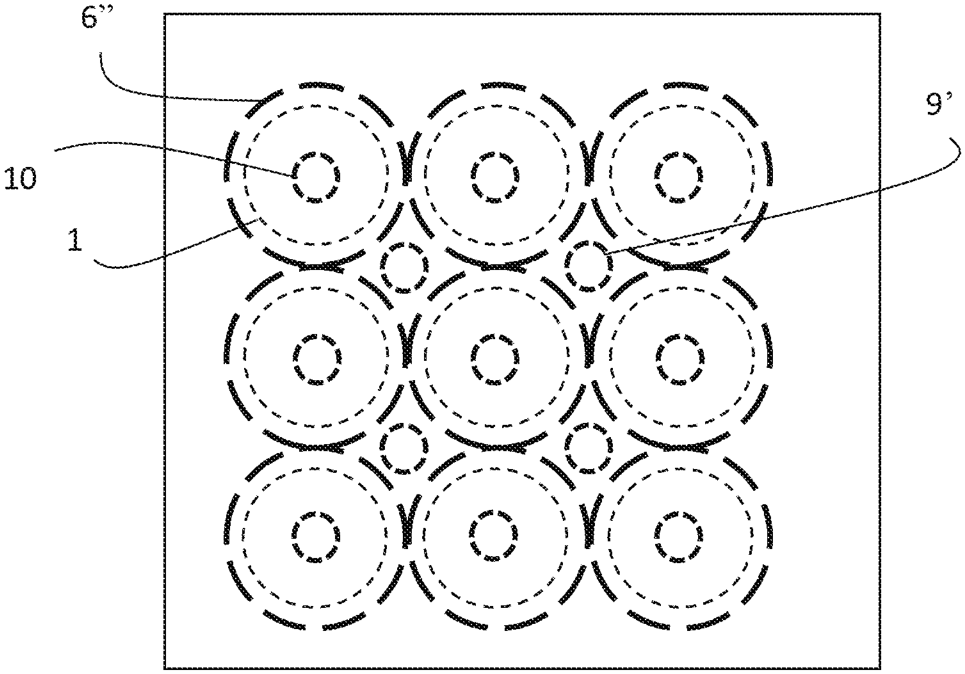
Figure 10:
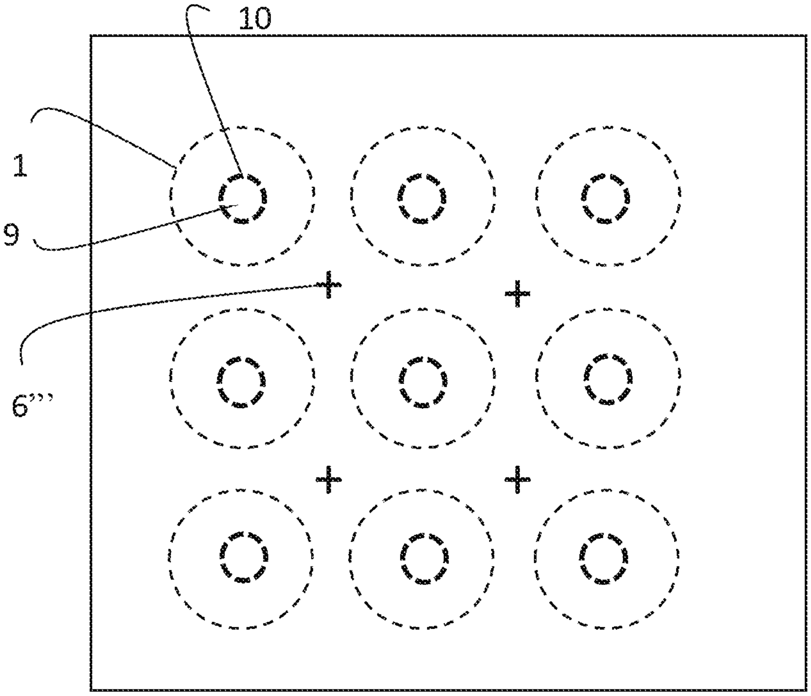
Figure 11:
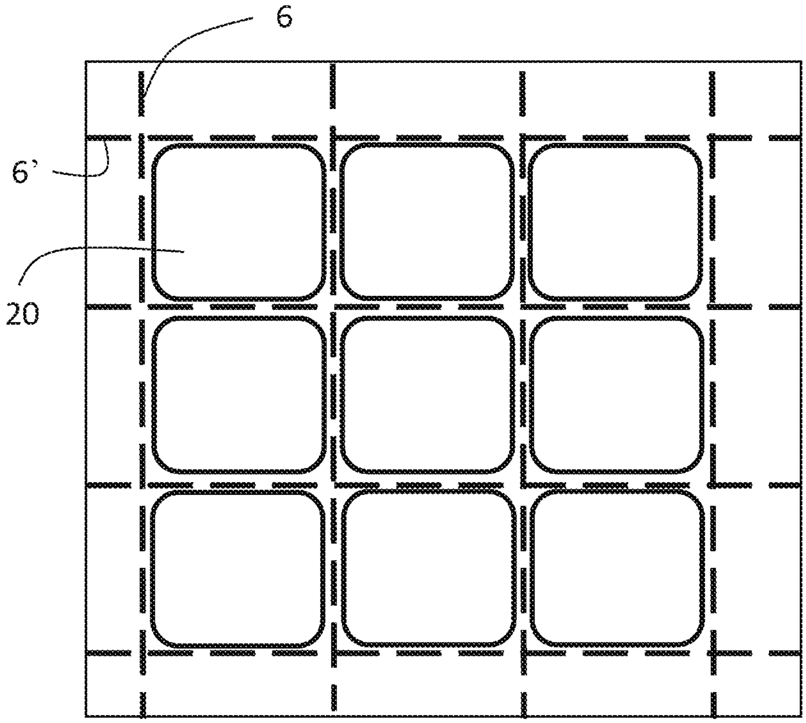
Figure 15A:
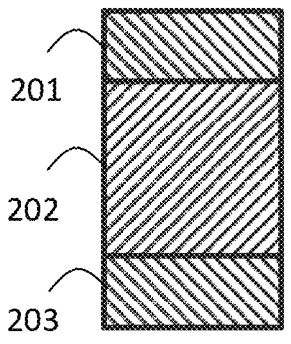
Figure 15B:
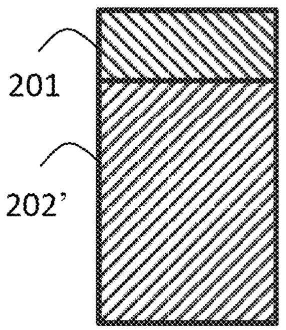
Figure 15C:
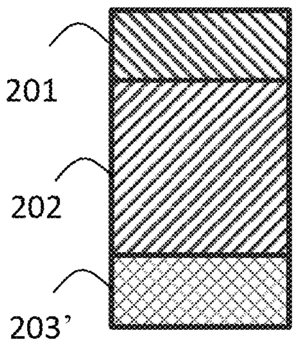
Figure 15D:
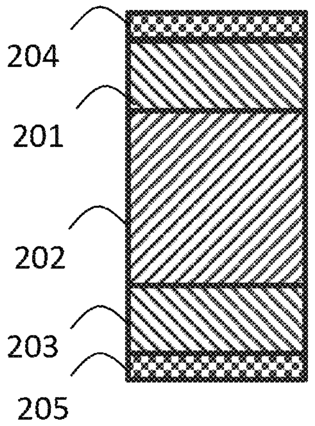
Figure 15E:
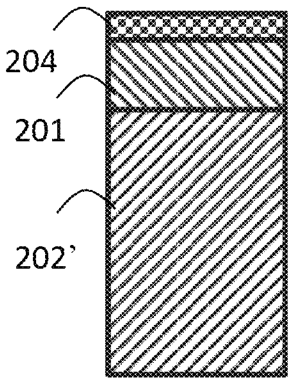
Figure 15F:
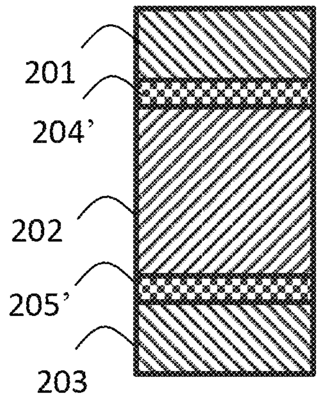
Figure 16:
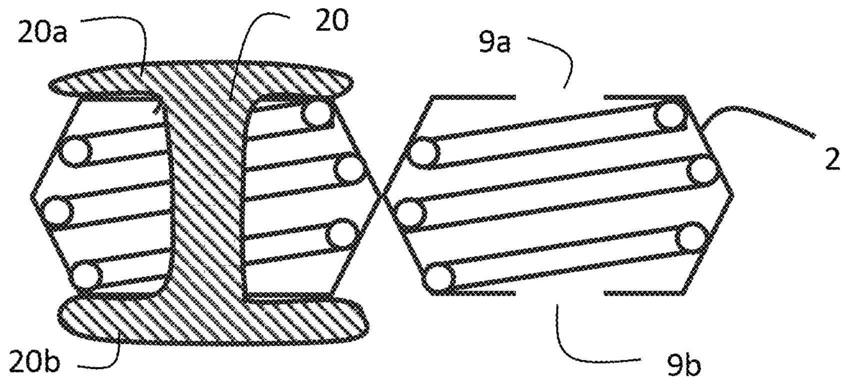

FIG. 8 is a schematic top-view illustration of a mattress in accordance with an embodiment of the invention;

FIG. 9 is a schematic top-view illustration of a mattress in accordance with another embodiment of the invention;

FIG. 10 is a schematic top-view illustration of a mattress in accordance with yet another embodiment of the invention;

FIG. 11 is a schematic top-view illustration of a mattress in accordance with yet another embodiment of the invention;

FIGS. **12*a*-*c*** are schematic cross-sectional views of the upper or lower part of foam elements in accordance with embodiments of the present invention;

FIGS. **13*a*-*c*** are schematic cross-sectional views of alternative foam elements arranged within spring units, in accordance with other embodiments of the present invention;

FIGS. 14*a-c* are schematic side views of pieces of foam material having various relaxed shapes, in accordance with embodiments of the present invention;

FIGS. 15*a-f* are schematic side views of pieces of foam material having various types of layered constructions, in accordance with embodiments of the present invention; and FIG. 16 is a schematic cross-sectional view from the side of a mattress in accordance with another embodiment of the present invention.

As illustrated in the figures, the sizes of layers and regions may be exaggerated for illustrative purposes and, thus, may be provided to illustrate the general structures of embodiments of the present invention. Like reference numerals refer to like elements throughout.

DETAILED DESCRIPTION OF THE INVENTION

For the purpose of exemplification, the invention will now be described in more detail by way of an embodiment and with reference to the accompanying drawings.

Figure 1:
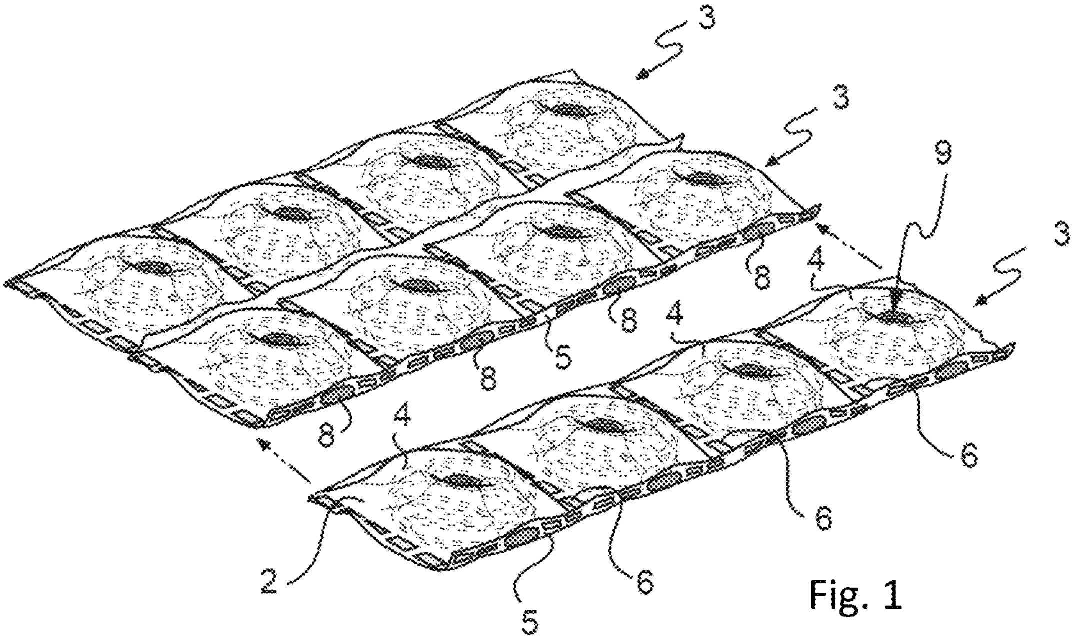
FIG. 1 is a perspective view of a part of a mattress according to an embodiment of the invention, prior to arrangement of the pieces of foam elements.
Figure 2:
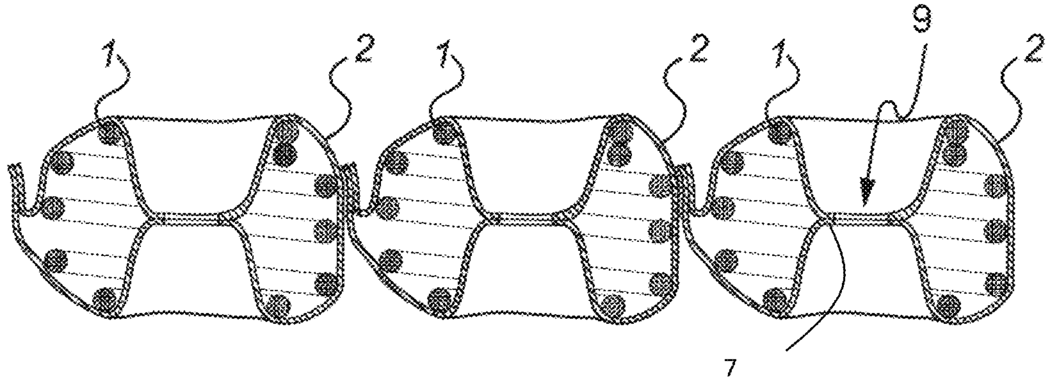
FIG. 2 is a sectional side view of part of the mattress in FIG. 1 seen in the string direction.

A spring mattress according to an embodiment of the invention comprises a plurality of interconnected coil springs 1 enclosed in casings/pockets 2, as shown in FIGS. 1 and 2. The casing is suitably made of a, preferably weldable, textile material, but also other materials, such as different types of plastic materials, can be used. It is also possible to use non-weldable textile materials, such as cotton cloth.

In this embodiment, the mattress comprises strings 3 of casing material 2, in which a plurality of pockets 4 are arranged. The pockets are here defined by at least one longitudinal connecting line 5 extending parallel to the longitudinal direction of the string and a plurality of transverse connecting lines 6 extending transversely to the longitudinal direction of the string. Preferably the strings comprise casing material of a folded piece of material, where the fold line extends in the longitudinal direction of the string. The closing longitudinal connecting line 5 is arranged at the opposite side of the string. Transverse connecting lines then extend between the fold line and the longitudinal connecting line. Alternatively, it is possible to use two or more pieces of material for making each string, in which case additional connecting lines may be required.

In the mattress, the springs are here oriented in the pockets so that the connecting lines are arranged at the side of the springs and, thus, between neighboring springs. Preferably, the casing material portions at the ends of the springs are thus essentially free of other connections. However, it is also possible to arrange the longitudinal connection line on top of the strings, overlying the spring ends.

In at least one of the springs, and preferably all the springs, the casing portions arranged at the ends of the springs are moved towards each other, through the spring, and connected to each other by connecting means 7, and preferably arranged to provide at least a certain degree of bias. Preferably the casing portions are moved so far towards each other as to make contact with each other, but of course it is possible to interconnect them also otherwise, by wire, a long clamp or the like. The connecting means 7 may comprise mechanical connecting element, such as a clamp, a rivet or the like, or a surface joint, such as an adhesive, a weld or the like. Other fixing elements are, however, also conceivable. The load on the fixing element is normally small since the fixing elements are only loaded when the mattress is unloaded, whereas there is no load at all when the mattress is loaded. In a preferred embodiment, the joint is formed by one or several weld(s).

Figure 4:
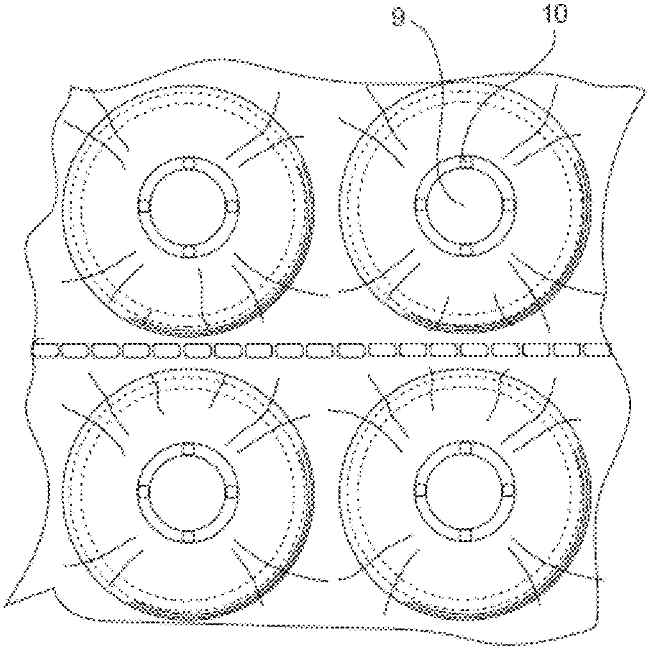
FIG. 4 is a view of part of the mattress of FIG. 1 as seen from above.

Further, end portions comprise an opening 9 through the joint, and through the spring. The opening 9 may preferably be substantially circular, but other shapes may also be used. Openings 9 though the length of the spring can help provide proper ventilation of the mattress. The openings are also used to stabilize and fixate the foam elements, as will be further discussed in the following. The opening is here substantially circular, as seen in FIG. 4, however other shapes of the opening can also be used. The diameter of the opening may for instance be between 5 mm and 50 mm, preferably between 10 mm and 30 mm, more preferably between 15 mm and 25 mm. The diameter of the opening is preferably much smaller than the diameter of the largest turn of the coil spring, and preferably also much smaller than the diameter of the smallest turn of the coil spring.

The end portions are here connected by welding points 10 distributed around the substantially circular opening 9, as seen in FIG. 4. Here four welding points are distributed around the opening, however any number of welding points, such as three, six or eight, can be used. Alternatively, a continuous weld around the opening can be used. The end portions are preferably connected to each other by welding, in which case a weld surface is arranged to connect the end portions to each other. The size and/or the location of the weld can advantageously be controllable and may be selected to give a desired height of the mattress and bias on the springs.

Coil springs of many sizes can be used in connection with the present invention, and basically any size of spring can be used. However, it is preferred to use springs with a diameter of 2-10 cm, and more preferably 3-7 cm, and most preferably 4-5 cm. The springs preferably comprise at least three turns, preferably fewer than 10 turns. Moreover they are advantageously made of spiral wire with a thickness in the range 0.5-3.0 mm, preferably a wire thickness in the range 1.0-2.5 mm. Preferably the springs are slightly spool-shaped, that is with smaller turns at the top and bottom.

In a mattress as described above, as illustrated in FIGS. 1 and 2, the strings with springs are preferably arranged side by side and fixed to each other. Preferably the rows are connected to each other by fixing points 8, which advantageously connect the longitudinal connecting line 5 of one string to the side of the neighboring string. Of course, a smaller or greater number of fixing points than is shown is conceivable. It is also possible to arrange a longer fixing line instead of a plurality of shorter fixing points. The connection of strings to each other can occur by welding or gluing. Preferably, the welding or gluing surface is distributed around the opening to provide good strength to the interconnection. This may for instance be achieved by point surfaces distributed symmetrically around the opening or by a continuous line surface around the opening. Also this connection can, however, alternatively occur by means of clamps, by Velcro tape, or in some other-suitable manner.

By arranging the interconnection of the strings via the longitudinal connecting line, automatic separation of the strings is provided, without requiring additional casing material. This is advantageous on the one hand since it results in a mattress with fewer springs, which has been found very favorable from the viewpoint of comfort and, on the other, since the mattress will thus be more cost-effective.

The solution with strings of continuous casing material in which there are individual casings for the springs is merely one of many ways to carry out the invention. The invention may for instance involve individual casings for the springs which are then attached to each other or a continuous sheet of casing material for the whole mattress comprising casings for the individual springs, or any other solution when it comes to the casing material.

The mattress according to the above-discussed embodiments can be manufactured by enclosing springs in pockets in strings of a casing material, the pockets being made of a continuous casing material with at least one longitudinal connecting line extending parallel to the longitudinal direction of the string and a plurality of transverse connecting lines extending transversely to the longitudinal direction of the string. Moreover, the method comprises the steps of moving casing portions arranged for the ends of the spring towards each other, connecting them to each other and punching or by any other means creating an opening through the casing portions at the ends of the spring. There might further be a step of interconnecting strings side by side.

For instance, the strings can be manufactured by the casing material being folded in two, and transverse welds being arranged to form open pockets. Subsequently compressed springs are inserted into the pockets, after which the pockets are sealed by a weld extending along the string. Moreover there is arranged, preferably without turning the springs, an additional weld through each spring for connecting the end portions to each other, an opening is punched through the casing portions at the ends, preferably in the middle of a number of welding points or a continuous weld, and a plurality of springs are joined side by side to form a mattress, the longitudinal welds being positioned between the strings.

The steps can be performed in different orders, and so that the connecting lines are arranged at the side of the springs and, thus, between neighboring springs. The step of moving the end portions towards each other usually implies that bias occurs by connection by means of connecting elements in such a manner that the springs in the biased state have a smaller longitudinal extent than in the original, non-biased state. Such bias can occur either directly after encapsulating the springs in the casing material, that is before they are assembled to form a mattress, or once the mattress is assembled. Preferably, however, bias occurs before the springs are enclosed in the pockets of strings, in which case it is possible to use a considerably smaller amount of casing material. Especially the amount of casing material can be made smaller the greater the bias and the thinner the mattress. In this manner, conveniently all springs in the mattress layer are biased.

In the manufacture of mattresses, it may also be ensured, as discussed above, that at least two neighboring strings are connected to each other so that an intermediate separation distance is provided between them.

Moreover, the strings with springs are preferably interconnected side by side, as indicated in FIG. 2 for instance. As mentioned above, this can take place by arranging fixing points on the longitudinal connecting lines for fastening at the side of neighboring strings.

Figure 3:
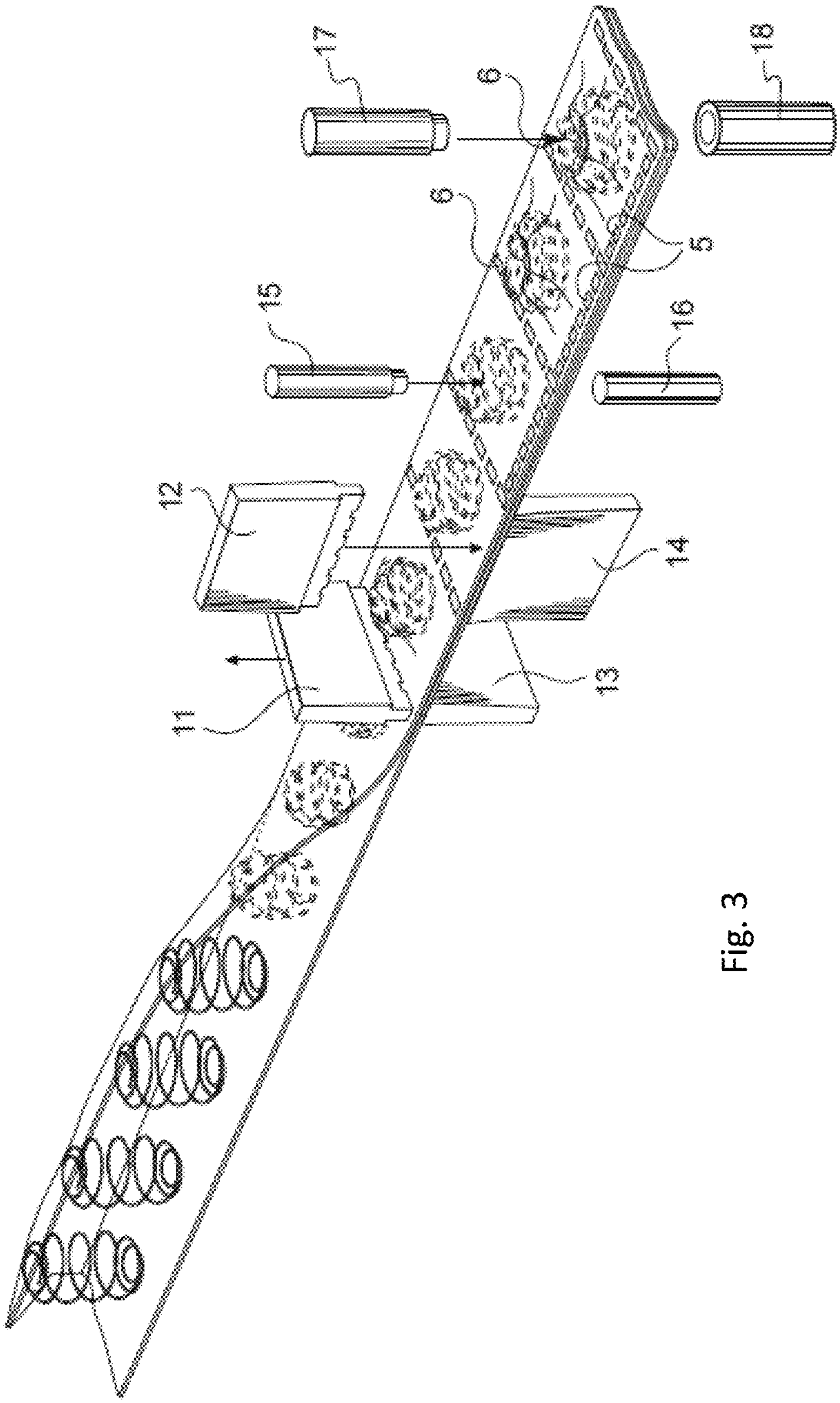
FIG. 3 is a schematic perspective view obliquely from above of a device for manufacturing the mattress according to FIGS. 1 and 2, in accordance with an embodiment of the invention.

A device for carrying out the method above comprises means for enclosing coil springs in pockets of strings, the pockets being made of a continuous casing material with at least one longitudinal connecting line extending parallel to the longitudinal direction of the string and a plurality of transverse connecting lines extending transversely to the longitudinal direction of the string. These means may comprise a device for folding casing material around a row of springs, and equipment for welding of connecting lines in the folded casing material, as schematically illustrated in FIG. 3. Instead of compressing the springs when placed in the casing, and while the casing is being folded over them, it is alternatively possible to compress the springs separately and then, in the compressed state, insert them into the folded casing.

The welding equipment preferably comprises welding dies 11, 12 which are movable towards the casing material, and corresponding anvils 13, 14 on the opposite side. Preferably separate pieces of welding equipment are arranged to generate the longitudinal connecting lines and the transverse connecting lines respectively. The means for enclosing the coil springs is adapted to arrange the connecting lines at the side of the springs so that they are positioned between neighboring springs of the completed mattress.

Further, the device comprises means for moving casing portions arranged for the ends of the spring towards each other and connecting them to each other and means for interconnecting strings side by side.

The means for moving casing portions arranged for the ends of the spring towards each other and connecting them to each other preferably comprises an inserter 15 and, arranged at a distance therefrom, a counteracter 16, such as an anvil. In use, springs are placed so that one end faces the inserter and the other the anvil. The inserter is movable towards and away from the anvil to move casing material at one spring end through the spring towards the casing material on the other side. The inserter 15 is preferably a welding die for generating a connecting weld. Alternatively, however, other fixing means can be provided instead. It is also possible to use a movable anvil, in which case both sides of the spring are pressed towards each other, after which stitching, welding or similar connecting may occur.

The device also comprises means for punching holes in the casing portions at the ends of the springs. The punch here comprises a punching piece 17 and an abutment or anvil 18, the punch 17 here being punched through the spring towards the abutment 18 and thereby punching out a substantially circular opening in the casing portions at the ends of the spring. Alternatively, the openings can be created by for instance cutting. In one embodiment, the openings may be formed by a rotating cutting tool, such as a drill. The casing may also be pre-holed to create the openings before the other steps.

Figure 5:
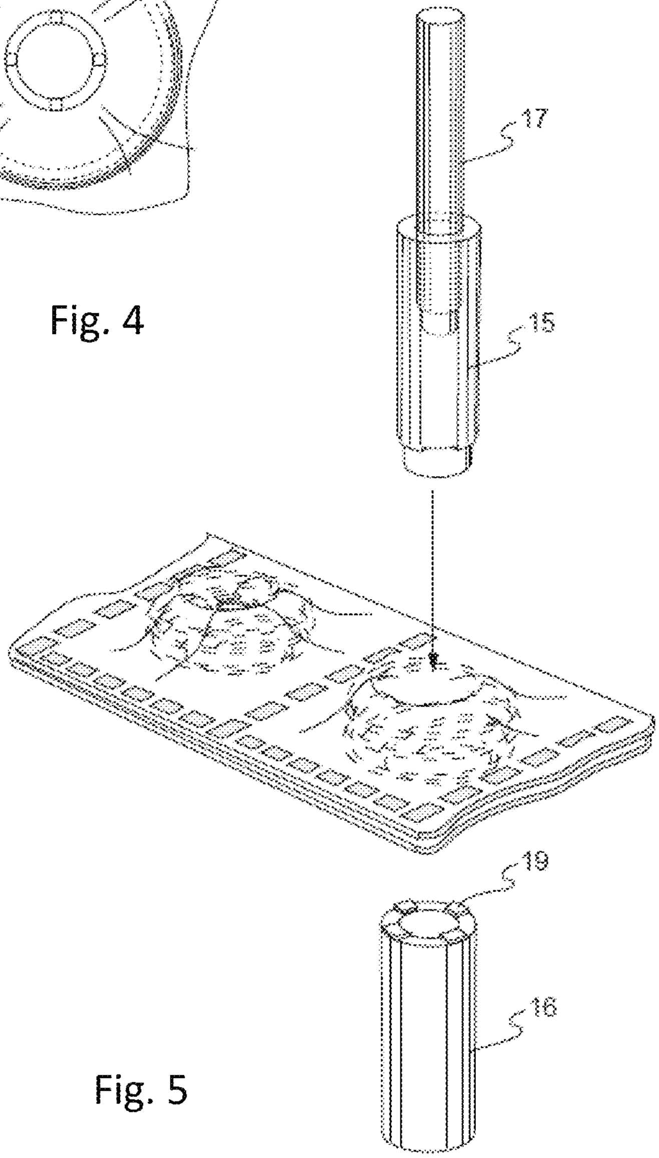
FIG. 5 is a schematic perspective view obliquely from above of the step of punching holes in the manufacture of a mattress according to an alternative embodiment of the invention.

The interconnection of the casing portions may also be created in the same step as the creation of the opening, for instance by creating welding points around the punching simultaneously as doing the punching, as seen in FIG. 5. A circular insertion means 15 is here attached to a circular counteracter 16 while a punch 17 travels through the tube shaped inserter and punches a hole in the casing portions through the spring. The connecter here comprises four protrusions 19 in the profile of the part to be connected to the insertion means, the protrusions defining the welding points to be created between the casing portions.

A system according to the invention can advantageously comprise a plurality of parallel devices, such as two devices operating in parallel.

Moreover, means are included for interconnecting the strings with springs preferably side by side, as indicated in FIG. 2 for instance. As mentioned above, this can take place by arranging fixing points on the longitudinal connecting lines for fastening to the side of neighboring strings.

It is preferred for the bias of the springs to be performed so that the length of the springs in the biased state is less than ⅔ of the length of the same springs in the non-biased original state, and preferably less than ½. It is also preferred for the ratio between the length of the springs and the diameter thereof in the biased state to be less than 2, and preferably less than 1, and most preferred less than ½.

The longitudinal connection line of the strings may be arranged on top of the springs. However, preferably the longitudinal connection line is arranged along the sides of the springs instead of over the ends.

Moreover, the smooth end portions are moved towards each other and attached by welding for instance. Therefore, very thin mattresses can be provided in this manner, in fact down to a thickness of one or a few centimeters. For example, a mattress with a thickness of 25 mm can be provided. Thus, the invention might be well suited for seat cushions, overlay mattresses to be placed on top of other mattresses and similar applications where thin mattresses are required. Thus, being able to make overlay or topper mattresses of pocket springs is very advantageous, not only because they can be made softer, thereby increasing the comfort, but also because springs are normally not fatigued over time, as is polyethylene or like materials. Mattresses according to the invention can be made very light, soft and comfortable, and also, due to the bias, very rigid and hard, as desired. The opening through the spring also ensures good ventilation of the mattress, thus providing better drying, cooling and/or heating, less growth of bacteria and the like, and increased comfort.

The invention makes it possible to easily adjust the height of the spring elements by varying the position and size of the fixing means when connecting the end portions to each other. In this way it is also easy to provide different thicknesses of different portions of the mattress, or provide mattresses of different thicknesses, without having to make any changes in the manufacturing process in addition to this connection. The manufacture will in this way be very flexible and controllable. In particular, it is possible to provide mattresses with a cup shape or the like to be used as seat cushions or other mattresses intended for sitting. Similar changes of height can also be used in other mattresses to control the user's position on the mattress.

The above-discussed mattress is of the type comprising a plurality of interconnected coil springs enclosed in casings, the springs having a first and a second end, wherein for at least one of the springs, casing portions arranged at the first and second ends of the spring are connected to each other through the spring by a joint, and wherein said joined casing portions comprise openings through the spring. In addition, as will now be discussed in more detail, pieces of foam material are arranged in the openings.

Figure 6A:
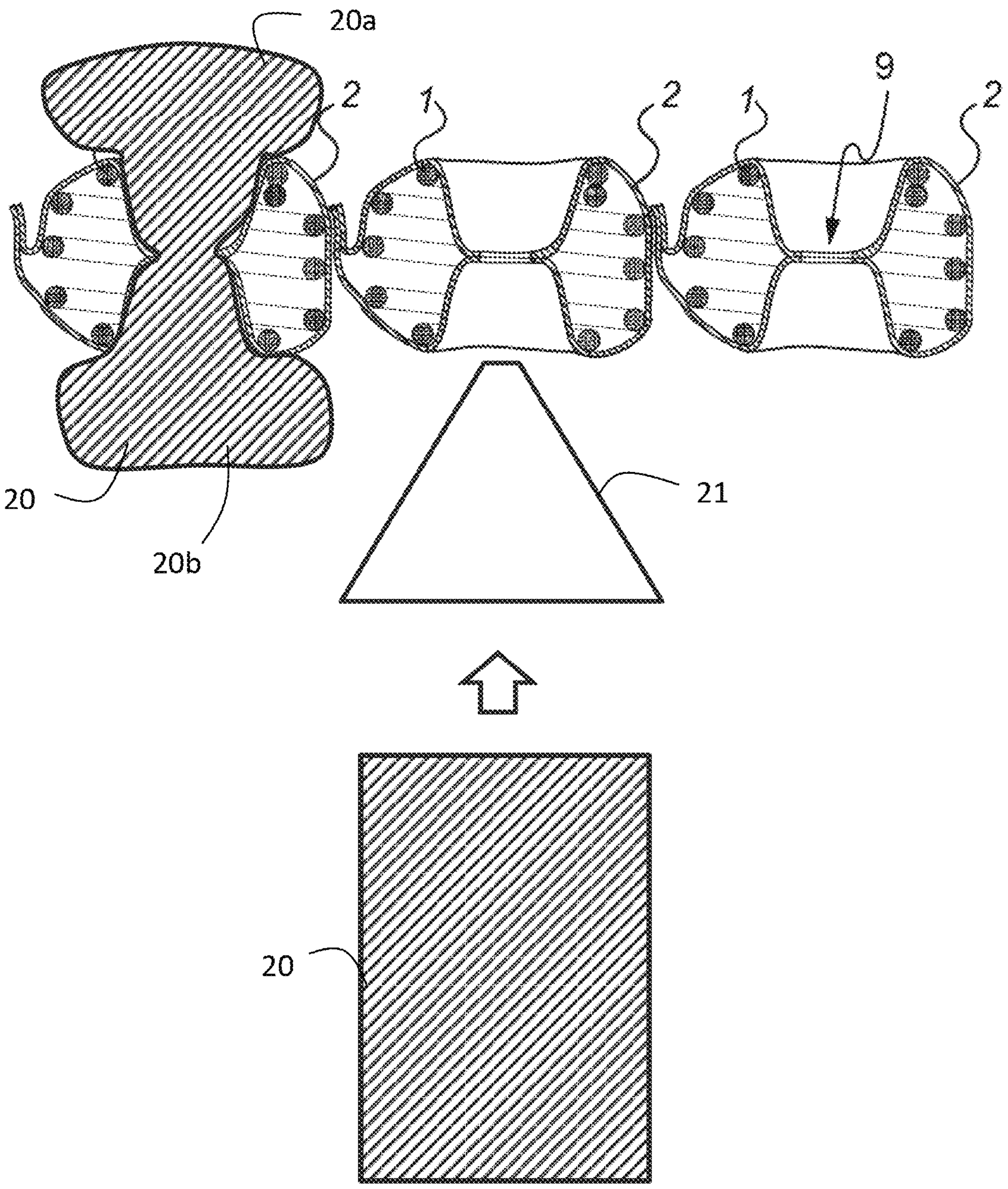
Figure 6B:
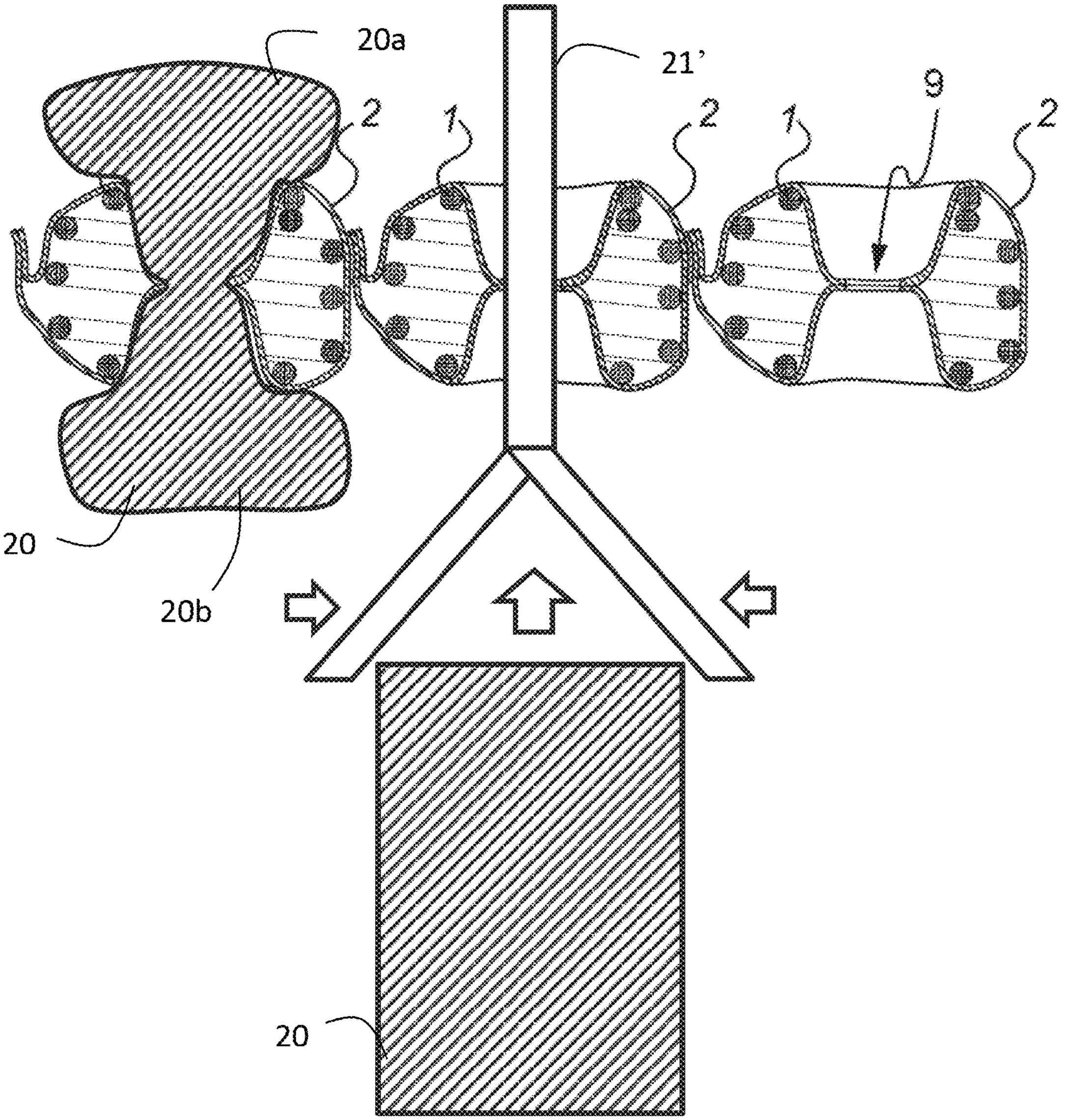

In an embodiment, illustrated in FIGS. 6*a* and 6*b*, such an inserted piece of foam material 20 is illustrated, and also a process and device for insertion of the piece of foam.

The piece of foam material 20 extends towards the first end of the spring with a first part 20*a*, and towards the second end of the spring with a second part 20*b*.

The piece of foam material 20 is inserted through the opening 9 formed in the casing/pocket around the spring, forming a waist in the opening. Hereby, the piece of foam material is held mechanically in place, in a fixed position. Hereby, a strong mechanical connection is formed, and there is no need to connect the pieces of foam material directly to the coil springs. Instead, the foam material is arranged separated from the coil springs by the casing fabric. For increased fixation, additional connection elements may optionally also be used, such as an adhesive, welding or the like. However, for most cases and applications, the mechanical connection is sufficient.

Thus, each pocket, i.e. the casing enclosing each spring, is formed as a toroid, having a doughnut shape, forming a circular compartment enclosing the spring. Further, the foam material may be formed as an hourglass, having a central waist, and two expanding, mushroom shaped parts extending away from the waist in two opposite directions. Due to the elastic and flexible properties of the foam material, the two shapes, i.e. the toroid shape of the casing and the hourglass shape of the foam material will to a large extent be complementary to each other, so that the overall cross-sectional shape of the pocket unit will be in the form of a circle, or a rectangle with rounded corners, or a shape therebetween.

At least one of said first and second portions 20*a*, 20*b* of the pieces of foam material preferably extends past the first and second end of the spring, respectively. In the illustrative example of FIGS. 6*a* and 6*b*, the first and second portions 20*a*, 20*b* both extend out past the first and second end of the spring. Hereby, a foam provides an outermost layer of the mattress on both sides.

For example, as illustrated in FIG. 7, the piece of foam material 20 may, when arranged in the spring, be provided with a generally circular waist, or any other shape corresponding to the shape of the opening. Towards both ends, the piece of foam material then expands from the wait towards the top and bottom. The portions 20*a*, 20*b* protruding out from the spring may have generally rectangular cross-sections, such as square cross-sections. However, other shapes, such as a circular cross-sectional shape, are also feasible.

Part(s) of the foam material extending out past the first or second end of the spring may have cross-sectional dimensions which are equal to or greater than the diameter of the upper or lower end convolution of the spring through which it extends. Hereby, the extending foam material forms a relatively continuous layer above the springs.

In an embodiment the greatest cross-sectional dimensions of the part(s) of foam material extending out from the spring may be equal to or greater than the diameter of the largest turn of the spring. Hereby, the foam material will essentially cover the spring, when seen from a direction parallel to the axial direction of the spring.

Figure 12A:
Figure 12B:
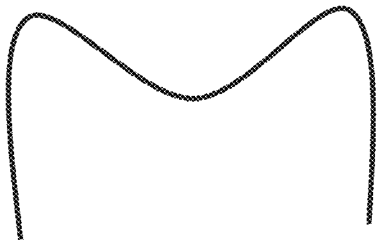
Figure 12C:

The upper and lower surfaces formed by the portions 20*a* and 20*b*, respectively, may be slightly curved, bulging out in a convex shape, as illustrated schematically in FIG. 12*a*. However, other shapes are also feasible. For example, the upper and/or lower surface may have an inward indention, forming a concave or cup shape, as illustrated in FIG. 12*b*. The upper and/or lower surface may also be generally flat, as illustrated in FIG. 12*c*.

In the illustrative example of FIGS. 6*a* and 6*b*, the piece of foam material extends past the spring both in an upward or downward direction. However, it is also feasible that the piece of foam material only extends out from the spring in one direction.

Figure 13A:
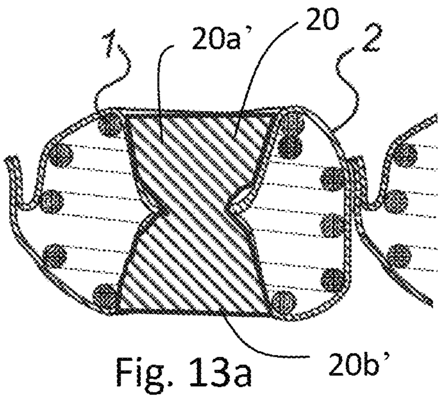

It is also feasible to provide a piece of foam material which extends generally to the plane formed by the upper and/or lower turn of the spring, so that the upper and/or lower surface of the piece of foam material is/are generally flush with the upper and/or lower side of the pocket unit. Such an example is illustrated in FIG. 13*a*, where the upper portion 20*a*' terminates essentially in the plane formed by the upper turn of the spring, and the lower portion 20*b*' terminates essentially in the plane formed by the lower turn of the spring.

Figure 13B:
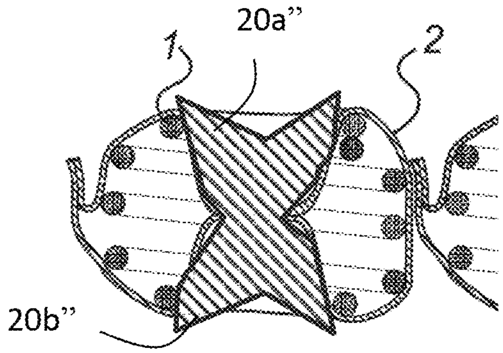

In a similar embodiment, illustrated in FIG. 13*b*, the upper and lower surfaces of the piece of foam material, formed by the upper and lower portions 20*a*" and 20*b*", are generally cup shaped, and have rim portions extending somewhat beyond the upper and lower turn of the spring, respectively, and central parts which lie slightly below the upper and lower turn of the spring.

Figure 13C:
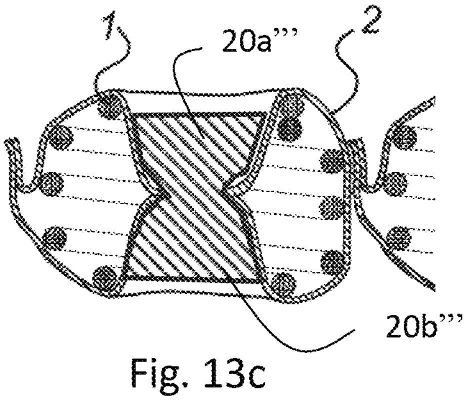

In yet another embodiment, illustrated in FIG. 13*c*, the piece of foam element, with portions 20*a*''' and 20*b*''', does not extend to the upper and lower turn of the spring, and consequently terminates at positions fully within the spring.

Such embodiments may also be combined in various ways, such as having a piece of foam material that extends out through the spring on one side, and not on the other, having one side of the piece of foam being convex and one being concave, etc. Thus, it is also feasible that the foam material extends out past the spring end on only one side. It is also feasible that the foam material does not extend out past any of the ends. In such embodiments, the foam material may be flush with the plane of the end convolution of the coil spring, or be situated inside the spring, at a distance from such a plane.

In an embodiment, as in the illustrative example of FIGS. 6*a* and 6*b*, the piece of foam material may be compressed in the part arranged in the opening, thereby forming a waist in the piece of foam material at said opening, and wherein the first and second portions of the piece of foam material gradually expands into larger cross-sectional shapes in a direction away from the opening. Thus, the foam material may have a relaxed shape before being inserted into the spring, and then assume one of the above-discussed shapes when in place inside the spring, such as the hourglass shape forming a waist in the middle of the piece of foam material. The relaxed shape is the shape of the foam material when not constrained within the springs, i.e. an unbiased shape.

The pieces of foam material may have a relaxed shape with essentially uniform cross-sectional shape and dimensions, as seen perpendicularly to the length direction. The relaxed shape may e.g. be in the shape of a cuboid, such as a square cuboid or a right square prism, as in the illustrative example of FIGS. 6*a* and 6*b*, and as also illustrated in FIG. 14*a*. However, other relaxed shapes are also feasible, such as the shape of a cylinder, as schematically illustrated in FIG. 14*b*. In the illustrative example, the cylinder has a circular cross-section. However, other cross-sectional shapes are also feasible, such as oval, polygonal, etc. Other shapes are also feasible, such as a shape having varying dimensions over the height. For example, the relaxed shape may have smaller cross-sectional dimensions at the central part, and larger cross-sectional dimensions at the upper and lower part, thereby forming a waist in the material, as shown e.g. in FIG. 14*c*. In one embodiment, the foam material may have a relaxed shape generally corresponding to the shape assumed when placed in the spring units.

The foam material can be made of various materials. In a preferred embodiment, the foam is made of urethane, latex or a visco-elastic foam.

The mattress may be produced by first enclosing the springs in pockets, connecting the casing material at the ends together through the springs, and forming of openings in the connection area, as discussed above, e.g. in relation to FIG. 2. Thereafter, pieces of foam material may be inserted into the spring units. For example, pieces of foam having a relaxed shape which is larger than a constrained shape assumed in the inserted position may be compressed for insertion. For example, the pieces of foam material may be pushed into an open-ended cone 21, such as a funnel, as in the illustrative example of FIG. 6*a*. However, other ways of compressing the pieces of foam material into a smaller dimension are also feasible, such as forming a temporary outer envelope layer around the foam material, which can be removed once the foam material has reached its intended position.

In another embodiment, as illustrated in FIG. 6*b*, the piece of foam material is instead pulled through the opening inside the spring. This may e.g. be made by a gripping tool 21', arranged to be inserted through the opening 9, and to grip the a piece of foam element 20 on the other side, and then retract the gripping tool 21', thereby pulling the piece of foam element into the inserted position. The gripping tool 21' may e.g. be provided with pick-up claws or jaws at the end, comprising two or more arms/claws which may be separated apart before gripping, and which may be moved towards each other to grip the piece of foam material. The gripping tool 21' may have only two arms/claws, thereby functioning as a tweezer. However, more than two arms/claws may also be provided, such as 3, 4 or 5 arms/claws. In such embodiments, where the gripping tool 21' has at least 3 arms/claws, separated around the circumference, the gripping tool may also be used to compress the piece of foam material when it is gripped, thereby facilitating insertion through the opening 9.

However, alternatively, the foam material may be formed directly in the spring units, for example by being injected into the desired position in a liquid state.

In the above-discussed embodiment, illustrated in FIG. 3, the casings form a plurality of strings interconnected side by side, and preferably in parallel to each other, each string comprising a continuous casing material. The casings are defined by at least one longitudinal connecting line extending parallel to the longitudinal direction of the string and a plurality of transverse connecting lines extending transversely to the longitudinal direction of the string, and coil springs arranged in the casings and pockets of the string, wherein the connecting lines are preferably arranged at the side of the springs, and thus between neighboring springs.

However, the mattress may also be formed in other ways. In one embodiment, schematically illustrated in FIG. 8, the casings are formed by an upper and a lower sheet of fabric, the sheets being connected to each other between the springs to form the pockets. For example, the casings may be formed by a relatively large upper sheet and a relatively large lower sheet, the sheets being connected together along longitudinal connection lines 6' and lateral connections lines 6, e.g. forming a checkerboard pattern, thereby forming the individual pockets for the springs. Thus, in such an embodiment, the pockets are integrated with each other by the same material not only in one direction, as in the above-discussed string embodiments, but in two directions, i.e. both in a length and width dimension.

A connection 10 of the casing material arranged above and below the springs, through the springs, and forming of openings 9 therethrough, may here be accomplished in the same way as in the previously discussed embodiment, discussed with reference to FIG. 3. Further, insertion of pieces of foam material through the strings and through the openings may be made in the same way as discussed above, e.g. discussed in relation to FIG. 6.

In the embodiment of FIG. 8, the connection of the sheets may e.g. be provided in the form of connection lines, e.g. arranged as a first set of parallel lines 6' running in a first direction, and a second set of parallel lines 6 running in a second direction, the second direction e.g. being perpendicular to the first direction. Hereby, the connection lines may e.g. form a grid, enclosing the springs between them.

However, alternatively, the connection lines 6" may e.g. be arranged as circles, or polygons, encircling each spring, as illustrated in FIG. 9.

In yet another alternative, the connection 6''' may be formed as point connections, or connections formed as an X, a circle or the like, arranged between the springs, and preferably in each group of four springs, i.e. in each "four-leaf clover" formed by the springs, as illustrated schematically in FIG. 10.

Also in the embodiments discussed in relation to FIGS. 9 and 10, a connection 10 of the casing material arranged above and below the springs, through the springs, and forming of openings 9 therethrough, may here be accomplished in the same way as in the previously discussed embodiment, discussed with reference to FIG. 3. Further, insertion of pieces of foam material through the strings and through the openings may be made in the same way as discussed above, e.g. discussed in relation to FIG. 6.

In FIG. 11, a schematic illustration of the mattress in FIG. 8 and with inserted pieces of foam material 20 is provided. Here, the foam material is arranged to extend out from the springs, and to form overlying parts having a generally rectangular cross-section, such as also illustrated in FIG. 7. The foam material is here dimensioned so that the foam material will essentially cover the spring, when seen from a direction parallel to the axial direction of the spring, thereby forming a relatively uniform upper layer formed by the foam material.

To improve ventilation and aeration, additional second openings may also be provided at locations outside the springs. Such additional second openings 9' are illustrated in FIG. 9. The additional second openings may e.g. be arranged at locations between four adjacent springs, and may, as in the illustrative example, be arranged in all such groups of four adjacent springs, i.e. in the center of each "four-leaf clover" formed by the springs.

The pieces of foam material may be made of a homogeneous material, However, the pieces of foam material may also comprise a combination of different materials. Such different materials may e.g. be arranged in different layers, e.g. forming a laminated structure. The layers are preferably arranged in planes parallel with the mattress plane, i.e. arranged above or below each other in a direction parallel to the axial direction of the springs.

Some exemplary embodiments comprising such layered pieces of foam material will now be discussed, with reference to FIGS. 15*a-f*.

In the exemplary embodiment of FIG. 15*a*, the piece of foam material comprises a central layer 202, which is arranged to be placed through the opening within the spring, a separate top layer 201 and a separate bottom layer 203. In such embodiments, the top and/or bottom layers may have different properties than the central layer, such as being softer, denser, more visco-elastic, or the like. It is e.g. possible to use a less costly material as the central layer 202, such as polyurethane, and to use somewhat more costly materials as the top layer 201 and/or the bottom layer 203, such as latex, a visco-elastic material or the like.

In the exemplary embodiment of FIG. 15*b*, a similar construction is provided as the one discussed in relation to FIG. 15*a*. However, here a separate layer 201 is only arranged on one side of the central layer 202'. Here, the separate layer 201 is arranged as a top layer, but it may also be arranged as a bottom layer.

In the illustrative example of FIG. 15*a*, the top layer 201 and the bottom layer 203 may be of the same material, and have essentially the same properties, thereby providing the same properties on both sides of the mattress. However, it is also possible to use different materials in the top layer 201 and the bottom layer 203', as schematically illustrated in FIG. 15*c*.

In the embodiment of FIG. 15*b*, the piece of foam material comprises two layers, whereas the embodiments of FIGS. 15*a* and 15*c* comprise three layers. However, it is also feasible to use more than three layers, such as four or five layers, or even more.

In the embodiment of FIG. 15*d*, the structure of the piece of foam material is essentially similar to the one of FIG. 15*a*. Here, however, a thin additional layer 204 is arranged on top of the top layer 201, and a thin additional layer 205 is arranged below the bottom layer 203. The thin additional layer may e.g. also be of a foam material, but may also be other types of materials. One or both of the additional layers 204 and 205 may e.g. comprise cloth, padding, a piece of fabric or the like. The additional thin layers 204 and 205 may e.g. be arranged to provide a more durable upper and/or lower surface, a smoother upper and/or lower surface, a denser upper and/or lower surface, and the like.

Such a thin additional layer 204 may also be arranged only on one side of the piece of foam material, as schematically illustrated in FIG. 15*e*.

Additionally, or alternatively, It is also feasible to arrange such additional thin layers 204' and 205' between layers of foam material, such as between the top layer 204 and the central layer 202, and/or between the central layer 202 and the bottom layer 203, as in the illustrative example of FIG. 15*f*. Such additional thin layers 204' and 205' may be used to provide a stronger connection between the different foam materials, to facilitate manufacturing, etc.

In the above-discussed embodiments, the pocket units are arranged so that casing portions arranged at the first and second ends of the spring are connected to each other through the spring by a joint, and wherein the openings are arranged close together, in said joined casing portions. However, for some applications, and in particular for relatively thin mattresses, it is also feasible to arrange the pieces of foam material through openings arranged at the first and second ends of the pocket when these casing portions are kept separated, and not joined inside the spring.

FIG. 16 schematically illustrate such an embodiment. Here, the casing portions arranged at the first and second ends of the spring are separated and located at, or close to, the first and second ends of the spring. The openings 9*a*, 9*b* formed in the casing portions are consequently separated from each other, essentially by a distance corresponding to the height of the spring. The foam element 20 is arranged through both the first opening 9*a* and the second opening 9*b*, with a top portion 20*a* extending out from the first opening 9*a*, and a bottom portion 20*b* extending out from the second opening 9*b*. The central portion, extending through the spring, is here shown as a relatively thin section, having a cross-sectional dimension essentially corresponding to the size of the openings. However, the central portion much alternatively be much wider and thicker and extend out towards the sides of the spring. In such embodiments, the piece of foam material will form two waists, at the two openings, and with wider sections therebetween.

The invention has been described above by way of embodiments. Several variants of the invention are, however, conceivable. For instance, as mentioned above, other types of fixing elements can be used, as well as other solutions for the casing material, spring sizes etc. The pieces of foam material may also have other relaxed and/or constrained shapes. Furthermore, the device and the method can be designed in other ways. Such obvious variants must be considered to be comprised by the invention as defined by the appended claims.

The invention claimed is:

1. A spring mattress comprising a plurality of interconnected coil springs enclosed in casings, the springs having a first and a second end, wherein for at least one of the springs, casing portions arranged at the first and second ends of the spring comprise openings through the spring, and pieces of foam material arranged in said openings, so that a first portion of each piece of foam material extends towards the first end of the spring and a second portion of each piece of foam material extends towards the second end of the spring, wherein at least one of said first and second portions of the pieces of foam material extends past the first and second end of the spring, respectively.

2. The spring mattress of claim 1, wherein both of said first and second portions of the pieces of foam material extend past the first and second end of the spring, respectively.

3. The spring mattress of claim 1, wherein the casing portions arranged at the first and second ends of the spring are connected to each other through the spring by a joint, and wherein said openings are arranged in said joined casing portions.

4. The spring mattress of claim 3, wherein each piece of foam material is compressed in the part arranged in the opening, thereby forming a waist in the piece of foam material at said opening, and wherein the first and second portions of the piece of foam material gradually expands into larger cross-sectional shapes in a direction away from the opening.

5. The pocket spring mattress of claim 4, wherein the pieces of foam material are provided with a generally circular waist, and wherein the parts of the pieces of foam material extending past the first and/or second end of the spring have a generally rectangular cross-section.

6. The pocket spring mattress of claim 3, wherein the opening is within a perimeter of the joint between the casing portions.

7. The pocket spring mattress of claim 3, wherein the joint is formed by a surface joint.

8. The pocket spring mattress of claim 7, wherein the casing portions are connected by a continuous welding around the opening or a plurality of welding points distributed around the opening.

9. The pocket spring mattress of claim 3, wherein the joint is formed by a glue or a weld.

10. The spring mattress of claim 1, wherein a part of the foam material extending out past the first or second end of the spring has cross-sectional dimensions which are greater than the outer diameter of the upper or lower end convolution of the spring through which it extends.

11. The spring mattress of claim 1, wherein the foam material is a foam made of urethane, latex or a visco-elastic foam.

12. The pocket spring mattress of claim 1, wherein the pieces of foam material have a relaxed shape of a cuboid or a cylinder.

13. The pocket spring mattress of claim 1, wherein the pieces of foam material have a relaxed shape with essentially uniform cross-sectional shape and dimensions, as seen perpendicularly to the length direction.

14. The pocket spring mattress of claim 1, wherein the openings are substantially circular.

15. The pocket spring mattress of claim 1, wherein the average diameter of the openings is within the range 30-70% of the average diameter of the springs.

16. The pocket spring mattress of claim 1, wherein the average diameter of the openings is within the range 40-60% of the average diameter of the springs.

17. The pocket spring mattress of claim 1, wherein the average diameter of the openings is within the range 45-55% of the average diameter of the springs.

18. The pocket spring mattress of claim 1, wherein the casings form a plurality of strings interconnected side by side, each string comprising a continuous casing material, said casings being defined by at least one longitudinal connecting line extending parallel to the longitudinal direction of the string and a plurality of transverse connecting lines extending transversely to the longitudinal direction of the string, and the coil springs arranged in the casings of the string, wherein the connecting lines are preferably arranged at the side of the springs, and thus between neighboring springs.

19. The pocket spring mattress of claim 1, wherein the casings are formed by an upper and a lower sheet of fabric, the sheets being connected to each other between the springs to form the pockets.

20. The pocket spring mattress of claim 1, wherein the piece of foam material comprises at least two layers of different materials.

21. The pocket spring mattress of claim 1, wherein the casings are made of a weldable textile material.

22. The pocket spring mattress of claim 1, wherein the mattress further comprises additional second openings, arranged between the springs.

23. The pocket spring mattress of claim 1, wherein the springs are spool-shaped, having smaller convolutions at the top and bottom, and wherein the parts of the foam material extending out past the first or second end of the spring has cross-sectional dimensions which are equal to or greater than the diameter of the largest convolution of the springs.

24. A spring mattress comprising a plurality of interconnected coil springs enclosed in casings, the springs having a first and a second end, wherein for at least one of the springs, casing portions arranged at the first and second ends of the spring comprise openings through the spring, and pieces of foam material arranged in said openings, so that a first portion of each piece of foam material extends towards the first end of the spring and a second portion of each piece of foam material extends towards the second end of the spring, wherein at least one of said first and second portions of the pieces of foam material extends past the first and second end of the spring, respectively, and wherein said part of the foam material extending out past the first or second end of the spring has cross-sectional dimensions which are greater than the outer diameter of the upper or lower end convolution of the spring through which it extends.

* * * * *